Figure 1:
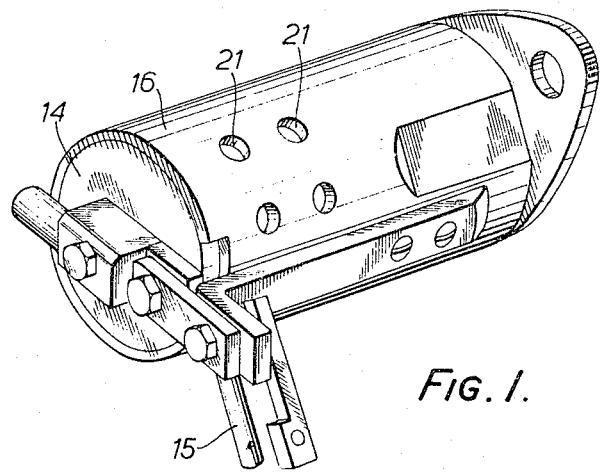
Figure 2:
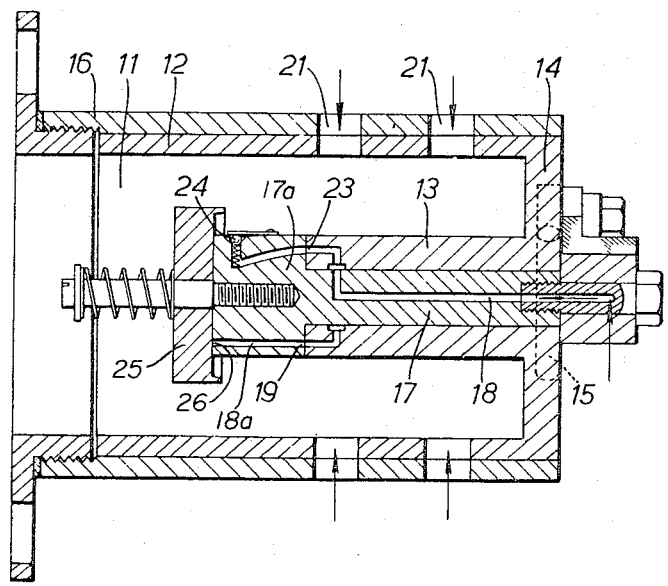

United States Patent Office 3,329,412
Patented July 4, 1967

3,329,412
CARBURETTORS
Frank Knappett, 46 Magdalen Road,
Oxford, England
Filed Nov. 5, 1964, Ser. No. 409,107
Claims priority, application Great Britain, Nov. 6, 1963,
43,878/63
4 Claims. (Cl. 261—41)

This invention relates to carburettors, for example for motorcar and motorbicycle engines, and one object is to provide an efficient carburettor which is simple and cheap to manufacture.

According to the present invention a carburettor has a mixing chamber having openings for air and fuel, and includes a throttling device which is adjustable to open and close the air and fuel openings continuously together, preferably substantially proportionally to each other.

Thus, it can be arranged that when the air opening is fully closed the fuel opening is also closed and that as the air opening is progressively opened by the throttling device, the fuel opening is progressively opened in proportion until both openings are fully open together.

In one preferred form of the carburettor, the throttling device has an adjustable member which comprises a pair of annularly-spaced, concentric sleeves in sliding relationship respectively with an outer sleeve and an inner sleeve, each sliding pair having overlapping openings, the degree of overlap changing progressively as the adjustable member is moved, the opening in the outer sleeve being for air the opening in the inner stem being for fuel.

Normally much more air is required than fuel and the air opening may be larger than the fuel opening in accordance with the greater radius of the outer sleeve compared with that of the inner stem, although the openings may be appropriately shaped in accordance with what is found to be the best relationship.

It is preferred that the openings are controlled by turning the adjustable member around the common axis of the sleeves.

Conveniently there are many circular openings for air in the outer sleeve and a single smaller opening for fuel in the inner stem with corresponding openings in the annularly-spaced concentric sleeves.

The invention may be carried into practice in various ways and one embodiment will now be briefly described by way of example.

The carburettor has a mixing chamber 11 which is of annular form at one end, being defined between a pair of annularly-spaced concentric sleeves 12 and 13 on an adjustable throttling member 14 which can be turned to a limited extent about the common axis of the sleeves in response to operation of the throttle control 15.

The sleeves slide respectively in relation to an outer sleeve 16 defining the carburettor casing and an inner stem 17 along which extends a passage 18 for fuel. The inner stem 17 is fixed in relation to the outer sleeve 16 so that the adjustable member 14 can turn about the inner stem.

Fuel pumped to the passage 18 by an electric or other fuel pump or fed under gravity is admitted to the mixing chamber 11 through a valve 19 defined by corresponding circular openings of perhaps 1 millimetre diameter in mating parts of the inner stem 17 and the inner sleeve 13 so that as the adjustable member 14 is turned, this valve 19 is adjusted progressively from being fully closed to being fully opened.

Air is admitted to the mixing chamber 11 through a similar valve arrangement having co-operating circular holes 21 in the outer fixed sleeve 16 and the outer adjustable sleeve 12. In this case there are sixteen holes 21 in each sleeve arranged in pairs parallel with the sleeve axis and each is about 3/16 inch in diameter.

The arrangement is such that when the air valve 21 is closed the fuel valve 19 is closed and that they are both opened progressively as the throttling member 14 is turned until both air and fuel valves are fully opened.

It will be appreciated that the only moving part is the throttle adjustment.

In some circumstances it may be necessary to have a pilot fuel valve of smaller aperture than the main valve 19 as shown at 23 allowing some fuel to enter the chamber for idling. This valve is arranged to close as the main fuel valve 19 opens.

When the valve 23 is open, it is arranged that the air valve 21 is just open to admit some air.

In order to prevent fuel entering the chamber from the pilot valve 23 when the engine is not turning over, a spring loaded ball valve 24 is associated with it.

Instead of having the pilot valve, the main valves 19 and 21 may be arranged not quite to close when the throttle is released for idling. A lightly spring-loaded poppet valve member 25 mounted on the end of stem extension 17a released by engine suction can be used to prevent fuel passing through passage 18a and out the exit aperture 26 of the slightly open valve 19 when the engine is stationery.

What I claim as my invention and desire to secure by Letters Patent is:

1. A carburettor comprising an elongated outer sleeve defining a mixing chamber, an opening for air in said sleeve, an inner stem coextensive with at least a portion of said sleeve in the direction of its longitudinal axis, a passageway in said stem having an opening for fuel unmixed with air, both of said openings leading directly into said mixing chamber, and an adjustable throttle comprising integrally formed outer and inner sleeve members embracing with a sliding fit said outer sleeve and said stem, respectively, said sleeve members being concentric and annularly spaced with respect to each other, said outer and inner sleeve members having first and second transfer openings cooperating with said air and fuel openings, respectively, for continuously opening and closing the same substantially simultaneously in response to the sliding movement of said throttle.

2. The combination of claim 1 wherein is further provided an extension on the end of said stem, a passage in said extension for communication with said passageway through said fuel opening, said passage having an exit aperture at the end of said extension, a poppet valve member for cooperating with said exit aperture and spring means for urging said valve member against said extension for closing said exit aperture in the absence of a vacuum in said mixing chamber.

3. The combination of claim 1 wherein is further provided a pilot opening in said inner sleeve member positioned so as to cooperate with said passageway when said fuel openings are closed.

4. The combination of claim 3 wherein is further provided a check valve in said pilot opening for closing said opening in the absence of a vacuum in said mixing chamber.

References Cited

UNITED STATES PATENTS

| | | | |
|---|---|---|---|
| 999,686 | 8/1911 | Westaway | 261—50 |
| 1,230,101 | 6/1917 | Bottome. | |
| 1,325,689 | 12/1919 | Burr | 261—50 X |
| 1,998,784 | 4/1935 | Mock. | |
| 2,022,957 | 12/1935 | Drouin | 261—50 |
| 3,132,191 | 5/1964 | Kennedy | 261—41 |

HARRY B. THORNTON, *Primary Examiner.*

T. R. MILES *Assistant Examiner.*